US009910455B1

(12) United States Patent
Morrison et al.

(10) Patent No.: US 9,910,455 B1
(45) Date of Patent: Mar. 6, 2018

(54) MAGNETIC ALIGNMENT CONNECTOR WITH L-SHAPED SHUNT

(71) Applicant: Dell Products L.P., Round Rock, TX (US)

(72) Inventors: Jason S. Morrison, Cedar Park, TX (US); Christopher A. Torres, San Marcos, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/344,302

(22) Filed: Nov. 4, 2016

(51) Int. Cl.
G06F 1/16 (2006.01)
H01F 7/02 (2006.01)

(52) U.S. Cl.
CPC ......... *G06F 1/1601* (2013.01); *H01F 7/0242* (2013.01)

(58) Field of Classification Search
CPC .... H01F 7/0242; G06F 1/1615; G06F 1/1616; G06F 1/1679
See application file for complete search history.

(56) References Cited

U.S. PATENT DOCUMENTS

| | | | | |
|---|---|---|---|---|
| 3,627,222 A | * | 12/1971 | Quenot | B65H 75/406 242/394.1 |
| 8,138,869 B1 | * | 3/2012 | Lauder | G06F 1/1613 24/303 |
| 2005/0194384 A1 | * | 9/2005 | Petit | A45C 13/1069 220/230 |

* cited by examiner

*Primary Examiner* — Anthony Q Edwards
(74) *Attorney, Agent, or Firm* — Baker Botts L.L.P.

(57) ABSTRACT

A portable information handling system may include a detachable component and one or more alignment connectors. Each alignment connector may be configured to receive a respective alignment post that is coupled to the detachable component in order to make a mechanical connection between the information handling system and the detachable component. Each alignment connector may include a magnet to draw the alignment post toward the connector and an L-shaped magnetically permeable shunt. The shunt may cover the back of the magnet and wrap down one side of the magnet, overlapping the alignment post when the alignment post is in contact with the alignment connector. The alignment connectors may be separate from connectors that provide electrical connectivity between the information handling system and the detachable component, and may reside within respective recessed openings on the information handling system.

20 Claims, 9 Drawing Sheets

MAGNETIC ALIGNMENT CONNECTOR WITH L-SHAPED SHUNT

BACKGROUND

Field of the Disclosure

This disclosure relates generally to information handling systems and, more particularly, to a magnetic alignment connector with an L-shaped shunt.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as laptop computers, notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery and include a display device. Some portable information handling systems include detachable components, such as keyboards, or are themselves detachable from other components, such as docking stations.

SUMMARY

In one aspect, a disclosed information handling system includes an alignment connector configured to receive an alignment post. The connector includes a magnet and a magnetically permeable shunt. A first portion of the shunt is substantially parallel to and in contact with the magnet on a first side of the magnet, the first side of the magnet being opposite and substantially parallel to a second side of the magnet toward which the alignment post is to be drawn. A second portion of the shunt extends from the first portion of the shunt, the second portion extending in a direction substantially parallel to a third side of the magnet, the third side of the magnet being substantially perpendicular to the first and second sides of the magnet, and the second portion of the shunt being longer than distance between the first and second sides of the magnet on the third side of the magnet.

When the alignment connector receives the alignment post, a first side of the alignment post is in contact with the second side of the magnet, and the second portion of the shunt extends alongside and substantially in parallel with at least a portion of a second side of the alignment post, the second side of the alignment post being substantially perpendicular to the first side of the alignment post.

In any of the disclosed embodiments, the alignment connector may include two or more magnets in contact with the shunt.

In any of the disclosed embodiments, adjacent ones of the two or more magnets may have opposite polarities.

In any of the disclosed embodiments, the two or more magnets may be the same size.

In any of the disclosed embodiments, one of the two or more magnets may be larger than at least one other one of the two or more magnets.

In any of the disclosed embodiments, the two or more magnets may include two magnets in contact with the first portion of the shunt.

In any of the disclosed embodiments, the two or more magnets may include at least one magnet in contact with the first portion of the shunt and at least one magnet in contact with the second portion of the shunt.

In any of the disclosed embodiments, the second portion of the shunt may be separated from the third side of the magnet by a designed gap.

In any of the disclosed embodiments, a third portion of the shunt may extend from the first portion of the shunt, the third portion extending in a direction substantially parallel to a fourth side of the magnet, the fourth side of the magnet being opposite and substantially parallel to the third side of the magnet and substantially perpendicular to the first and second sides of the magnet.

In any of the disclosed embodiments, the alignment connector may be located within a recessed opening of a first component of the information handling system, and the alignment post may be coupled to a second component that is detachable from the first component.

In any of the disclosed embodiments, the first component may be a portable computing device, and the second component may be a docking station for the portable computing device.

In any of the disclosed embodiments, the first component may be a portable computing device and the second component may be a detachable accessory for the portable computing device.

In any of the disclosed embodiments, the first component may include two or more alignment connectors, each configured to receive a respective alignment post coupled to the second component.

In any of the disclosed embodiments, the information handling system may include a second alignment connector configured to receive a second alignment post.

In another aspect, a disclosed connector includes a magnet, and a magnetically permeable shunt. A first portion of the shunt is substantially parallel to and in contact with the magnet on a first side of the magnet, the first side of the magnet being opposite and substantially parallel to a second side of the magnet toward which a post to be received by the connector is to be drawn. A second portion of the shunt extends from the first portion of the shunt, the second portion extending in a direction substantially parallel to a third side of the magnet, the third side of the magnet being substantially perpendicular to the first and second sides of the magnet, and the second portion of the shunt being longer than distance between the first and second sides of the magnet on the third side of the magnet. When the connector receives the post, a first side of the post is in contact with the second side of the magnet, and the second portion of the shunt extends alongside and substantially in parallel with at least a portion of a second side of the post, the second side of the post being substantially perpendicular to the first side of the post.

In any of the disclosed embodiments, the connector may further include one or more other magnets in contact with the shunt.

In any of the disclosed embodiments, adjacent ones of the magnets may have opposite polarities.

In any of the disclosed embodiments, one of the magnets may be larger than at least one other one of the magnets.

In any of the disclosed embodiments, two magnets may be in contact with the first portion of the shunt.

In any of the disclosed embodiments, the second portion of the shunt may be separated from the third side of the magnet by a designed gap.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2A-2B, 3, 4A-4C, 5A-5C, 6A-6G, 7A-7B and 8 wherein like numbers are used to indicate like and corresponding parts.

Figure 1:
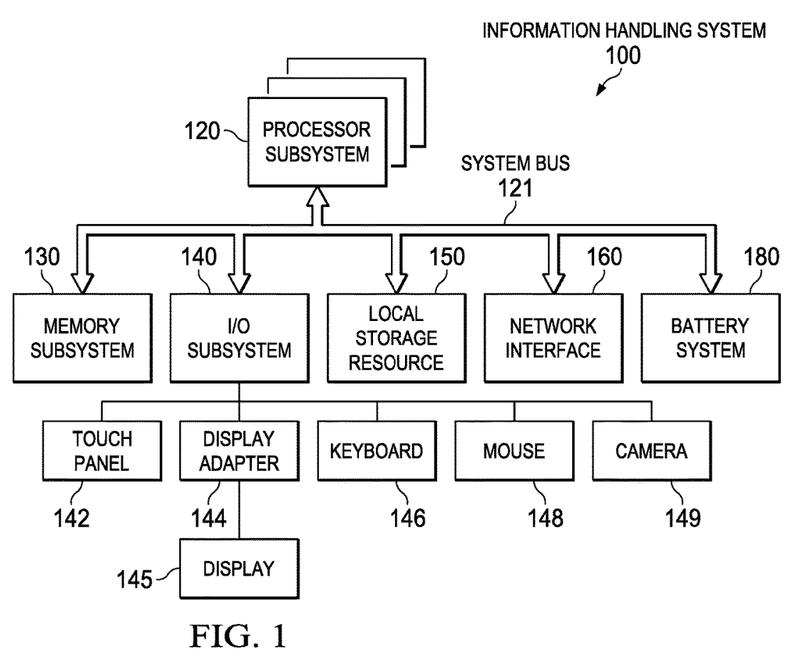
FIG. 1 is a block diagram of selected elements of an embodiment of an information handling system.

Turning now to the drawings, FIG. 1 illustrates a block diagram depicting selected elements of an embodiment of an information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Battery system 180 may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or other digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to, from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. In other embodiments, I/O subsystem 140 may include more, fewer, or different input/output devices or components. Touch panel 142 may include circuitry for enabling touch functionality in conjunction with a display device, shown as display 145, that is driven by display adapter 144. Camera 149 may represent any of a variety of imaging devices, such as a video camera, infrared camera, or combinations thereof.

In various embodiments of information handling system 100, such as portable devices or so-called all-in-one devices, display 145 may be mechanically integrated with other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

In some embodiments, one or more of the devices or components shown within I/O subsystem 140 may be detachable from information handling system 100. For example, in embodiments in which information handling system 100 is a portable information handling system, such as a laptop computer or a tablet computing device, keyboard 146 may be detachable from the information handling system. In some embodiments in which information handling system 100 is a portable information handling system, the information handling system may be detachable from a docking station or base. In at least some embodiments, information handling system 100 may include two magnetic alignment connectors that have L-shaped shunts, as described herein, each of which is configured to receive a respective mechanical alignment post that is coupled to a detachable component of information handling system 100.

In some embodiments of the present disclosure, a portable information handling system, such as a tablet computing device, may be detachable from a docking station or base. As the tablet computing device comes near its docking station or base, it may draw one or more alignment posts up into the tablet computing device to create the attachment, holding the alignments in place magnetically. This design eliminates traditional latching to hold the tablet computing device to the docking station or base, and instead relies on magnetic force to hold these components together.

In some embodiments, a tablet computing device may dock to a hinge bar, which includes traditional friction hinges to hold the tablet computing device at any angle. In some embodiments, the tablet-to-hinge-bar joint may be able to drive rotation of the friction hinges, may exhibit little or no "wobble", may be easy to align using the magnetic alignment connectors described herein, and may hold the table computing device and a docking station together except when a natural "peel-off" motion is initiated by the user. Magnets provide good normal force to resist a straight pull but do not do well at resisting moment loads. Relying on magnets alone to create a strong enough joint to drive the hinge motion may require very large magnets that are not practical to include in a portable device.

To prevent the tablet computing device from separating from its base when it is loaded with by a moment, an alignment post may extend up from the base into a receptacle on the tablet computing device. In some embodiments, the alignment post may retract into the base when the tablet computing device is not attached to the base. In some embodiments, the alignment posts may be tapered, and may be matched up to tapered receptacles in the tablet computing device. For example, an alignment connector on the tablet computing device may use a magnet to pull a tapered alignment post from the docking system or base into a receptacle, such as a recessed opening in the tablet computing device, for stability. In some cases, with a tapered design, very small dimensional changes (tolerances) on the posts or receptacles may propagate into large variations in mated depth. In other words, the insertion depth of the tapered post may vary widely, in different embodiments, due to tolerances on the post and on the receptacle. This variable insertion depth can cause issues for a simple magnet design because the magnetic force that a magnet exerts on an alignment post falls off at an exponential rate with respective to increased distances between the magnet and the alignment post.

In at least some embodiments, the magnetic alignment connectors described herein may provide sufficient force on their respective alignment posts to fully seat them and to prevent the tablet computing device from falling off of the base. These magnetic alignment connectors, which include an L-shaped shunt, may improve the magnetic force over the entire range of insertion depths (as driven by part tolerances) and corresponding gaps, when compared to alignment connectors with a simple magnet, without increasing the size of the information handling system.

Figure 2A:
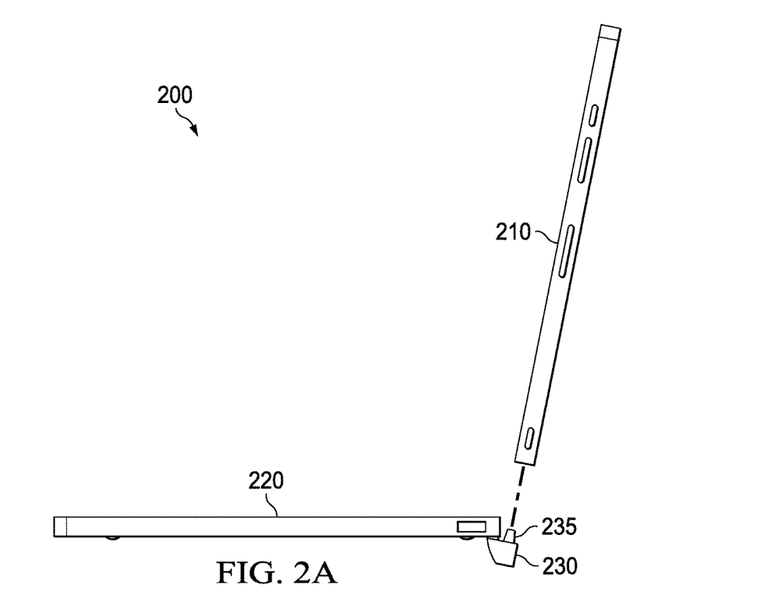
FIGS. 2A and 2B illustrate two views of an embodiment of a portable information handling system.
Figure 2B:
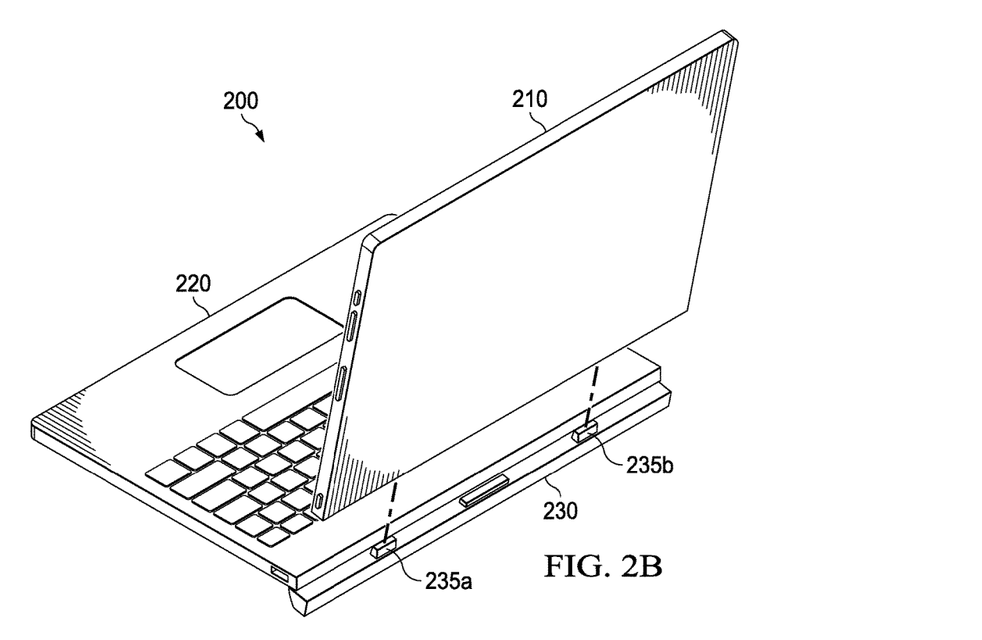

FIGS. 2A and 2B illustrate two views of an embodiment of a portable information handling system 200. In this example embodiment, portable information handling system 200 includes a tablet computing device 210 and a detachable docking station 220. Detachable docking station 220 includes a keyboard (such as keyboard 146) and a touch panel (such as touch panel 142).

In this example embodiment, detachable docking station 220 includes a hinge bar 230 comprising elements of various mechanical and electrical connections through which tablet computing device 210 may be coupled to detachable docking station 220. In this example, hinge bar 230 includes two mechanical alignment posts 235 usable for aligning the electrical connections between tablet computing device 210 and detachable docking station 220. In at least some embodiments, detachable docking station 220 may include two magnetic alignment connectors that have L-shaped shunts, as described herein, each of which is configured to receive a respective one of the mechanical alignment posts 235.

In the example embodiment illustrated in FIGS. 2A and 2B, a tablet computing device includes alignment connectors comprising magnets within recessed openings and the docking station includes corresponding alignment posts that fit into those openings. The alignment posts are thus connected to the tablet computing device by magnetic forces. In other embodiments, a docking station may include alignment posts and a tablet computing device may include corresponding alignment connectors comprising magnets within recessed openings into which the alignment posts are drawn.

In some embodiments, the alignment posts and corresponding alignment connectors are components of a connector system that is implemented for alignment purposes only. In such embodiments, the alignment posts and corresponding alignment connectors create structural and/or mechanical attachments only, and other connectors may be implemented on the table computing device and the docking station or base thereof for providing electrical connectively between the tablet computing device and the docking station or base. In some embodiments, portions of the alignment connection system and the electrical connection system may be implemented on a hinge bar of the docking station or base such that by making structural and/or mechanical attachments using the alignment connection system, the electrical connections on the tablet device and on the docking station or base are correctly aligned. In one example embodiment, a docking station or base may include two alignment posts, one on either side of its electrical connections.

Figure 3:
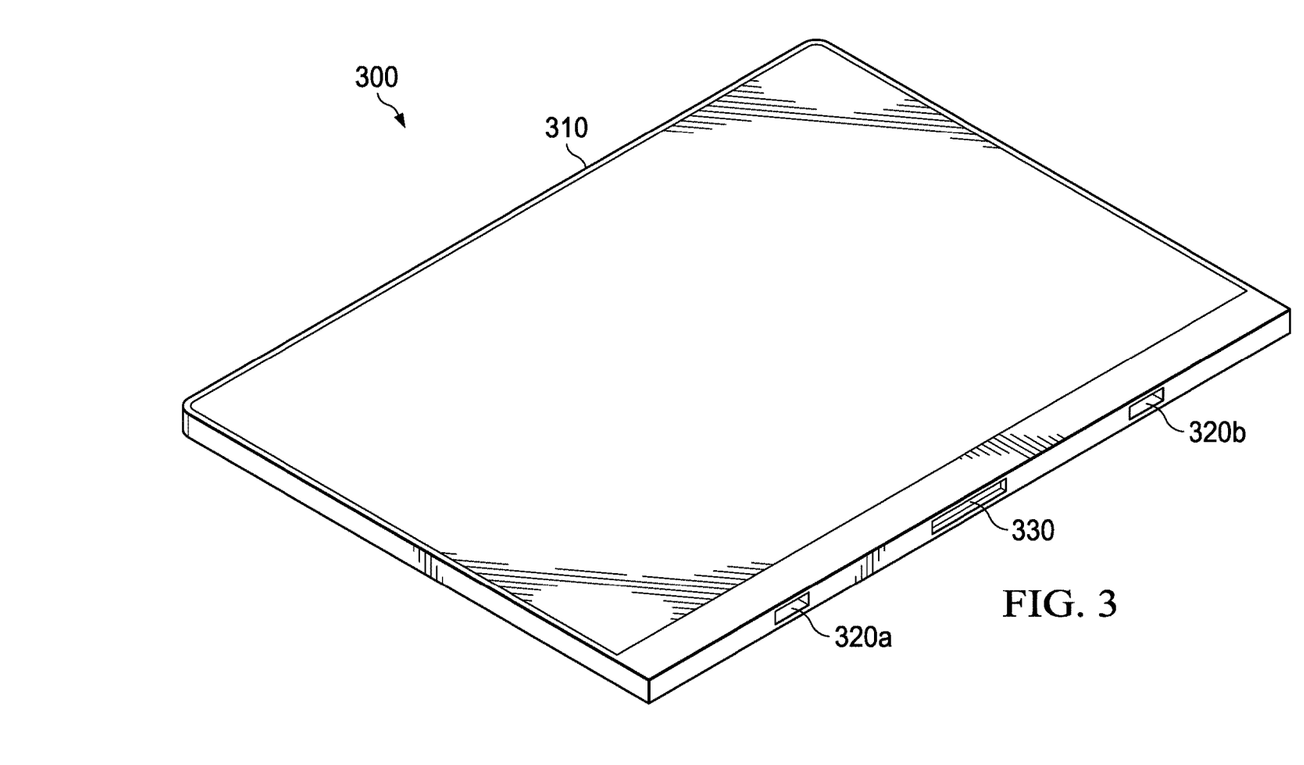
FIG. 3 is an illustration of an embodiment of a portable information handling system.

FIG. 3 is an illustration of an embodiment of a portable information handling system 300. Portable information handling system 300 may include a tablet computing device 310 that is detachable from a keyboard, docking station, base or other detachable component of the information handling system. In the example embodiment illustrated in FIG. 3, tablet computing device 310 may be coupled to the keyboard, docking station, base or other detachable component using a magnetic two magnetic alignment connectors that have L-shaped shunts, as described herein, each of which is configured to receive a respective mechanical alignment post. Each of the magnetic alignment connectors may reside within a respective recessed opening on the tablet computing device 310, shown as 320a and 320b.

Tablet computing device 310 may also include other types of connectors, such as a pogo pin connector 330, through which various electrical connections are made between tablet computing device 310 and a keyboard, docking station, base or other detachable component to which it may be coupled.

Figure 4A:
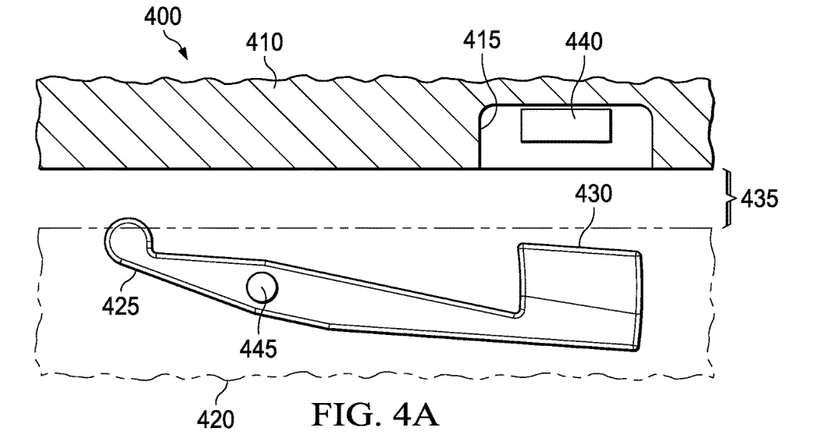
FIGS. 4A-4C illustrate different positions of an alignment post that is drawn into a magnetic alignment connector of an information handling system, according to at least some embodiments.
Figure 4B:
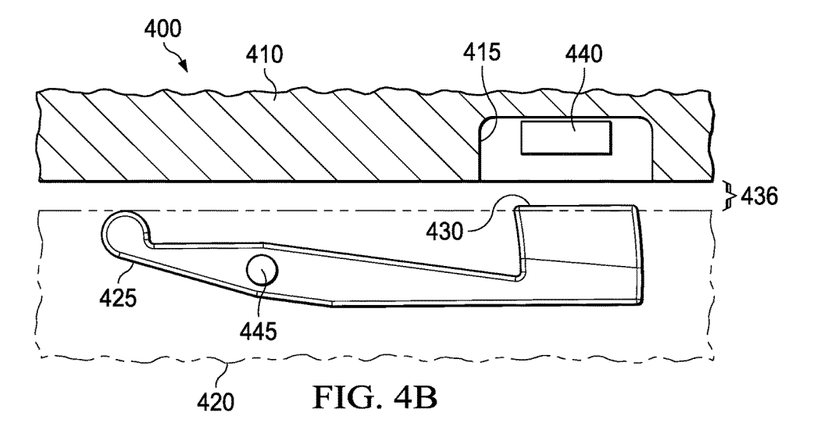
Figure 4C:
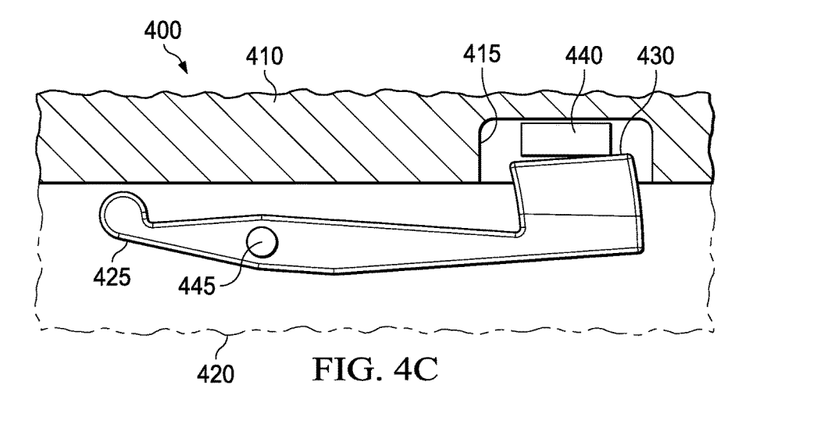

FIGS. 4A-4C illustrate different positions of an alignment post 425 that is drawn into a magnetic alignment connector of an information handling system 400, according to at least some embodiments. More specifically, information handling system 400 includes a first component 410 including a recessed opening 415 into which a head 430 of the alignment post 425 is to be drawn. In some embodiments, head 430 of alignment post 425 may be a tapered head, as described above. In this example embodiment, a magnetic connector 440 resides within the recessed opening 415 to draw head 430 of alignment post 425 toward and into recessed opening 415 and to make a mechanical connection with head 430 of alignment post 425.

In this example embodiment, alignment post 425 is recessed within a second component 420 of information handling system 400. As the magnetic connector 440 draws head 430 of alignment post 425 into the recessed opening 415, alignment post 425 pivots about a pivot point 445 at which alignment post 425 is mechanically coupled to the second component 420. In this example, as alignment post 425 rotates counterclockwise about pivot point 445, head 430 of alignment post 425 is snugged up tightly to the magnet within magnetic connector 440. In one embodiment, the first component 410 may be a laptop computer or a tablet computing device and the second component 420 may be a docking station, a keyboard, a base, or another detachable component of information handling system 400.

FIG. 4A illustrates the position of alignment post 425 at a point in time at which components 410 and 420 are separated by a gap 435. As component 410 is moved closer to component 420, magnetic connector 400 draws head 430 of alignment post 425 toward recessed opening 415. FIG. 4B illustrates the position of alignment post 425 at a point in time at which components 410 and 420 are separated by a gap 436, which is less than gap 435. As component 410 is moved still closer to component 420, magnetic connector 400 draws head 430 of alignment post 425 into recessed opening 415, where it makes a mechanical connection with magnetic connector 400. FIG. 4C illustrates the position of alignment post 425 when this mechanical connection is made. At this point, there may be no significant gap between components 410 and 420.

Magnetically permeable shunts are widely used to focus the magnetic flux from a magnet and increase its holding forces. For example, a cabinet door latch magnet typically includes a magnet sandwiched between two steel plates that focus the magnetic flux into a steel plate mounted on a the cabinet door. In some embodiments of an information handling system, an alignment connector may include a magnet and a magnetically permeable shunt to create a low resistance path for the magnetic flux to bridge across the gap between the magnet and a corresponding alignment post. In various embodiments, the alignment post, or at least a head portion thereof, may be made of iron, steel or another ferromagnetic material.

Figure 5A:
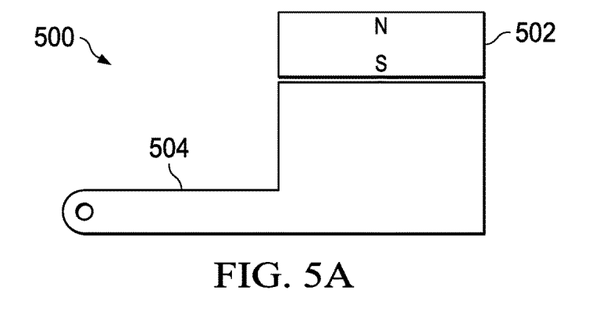
FIGS. 5A-5C illustrate three examples of the use of alignment posts and respective magnetic alignment connectors.
Figure 5B:
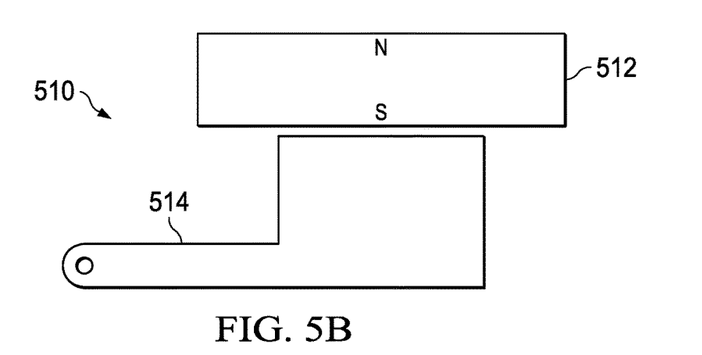
Figure 5C:
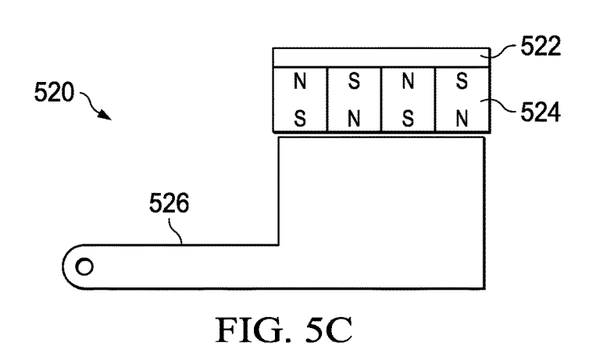

FIGS. 5A-5C illustrate three examples of the use of alignment posts and respective magnetic alignment connectors. More specifically, FIG. 5A illustrates a baseline connection system 500 in which a magnetic alignment connector includes a single magnet 502 sitting above an alignment post 504. The single magnet 502 draws alignment post 504 up to make a connection.

One method for increasing the magnetic force in a magnetic alignment connector is to enlarge the magnet. For example, the magnet may be sized such that the minimum force (at the maximum magnet-to-pin gap due to tolerances) is high enough to provide a suitable retention force for the connection. FIG. 5B illustrates a connection system that includes a larger magnet than the one shown in FIG. 5A. More specifically, FIG. 5B illustrates a connection system 510 in which a magnetic alignment connector includes a large single magnet 512 sitting above an alignment post 514. The large single magnet 512 draws alignment post 514 up to make a connection. However, simply increasing the size of the magnet may not be an acceptable solution for portable information handling systems because it requires too much space.

Another method for increasing the magnetic force in a magnetic alignment connector is to replace the single magnet of the baseline magnetic alignment connector with multiple magnets mounted with alternating polarity and a magnetically permeable shunt placed behind the magnets. For example, a flat piece of iron, steel, or another magnetically permeable material may be placed behind one or more magnets as a shunt that boosts the force of the magnet(s). This creates a tight loop for the magnetic flux and maximizes the force. However, this tight flux loop may make the magnet even more sensitive to gap sizes, and may only improve the magnetic force when there is a very small gap (e.g., when the magnetic alignment connector and corresponding alignment post are essentially touching). Since this approach may provide little or no benefit if the alignment post is not drawn all the way up in to the magnet in the magnetic alignment connector, this may not be an acceptable solution for at least some information handling systems.

FIG. 5C illustrates a connection system 520 in which a magnetic alignment connector includes four magnets, collectively shown as magnets 524, sitting above an alignment post 526. The four magnets are positioned such that adjacent ones of the magnets have opposite polarity. In this example, connection system 520 also includes a flat, magnetically permeable shunt 522 placed behind the magnets 524 (i.e., on the side of the magnet opposite the side toward alignment post 526). The magnets 524 draw alignment post 526 up to make a connection. As noted above, this approach may improve the magnetic force, but only when there is a very small gap. Note that a similar approach may be applied in a magnetic alignment connector that includes a single magnet, such that a flat, magnetically permeable shunt is placed behind the magnet to improve the magnetic force when there is a very small gap.

In some embodiments of the present disclosure, in order to increase the magnetic force in a magnetic alignment connector while meeting other design constraints, including size constraints, a magnetic alignment connector may include an L-shaped shunt that guides the magnetic flux from top of magnet into the side of the alignment post. In some embodiments, these magnetic alignment connectors may utilize an L-shaped shunt made from iron, steel, or another magnetically permeable material to increase the magnetic force on the alignment posts over the entire range of mated depths and corresponding gaps. The short leg of the L-shaped shunt may extend into the alignment post receptacle along the narrow side of the alignment post. Using this approach shunt may be wrapped across and down the side of the magnet such that there is some amount of overlap between the shunt and the alignment post In at least some embodiments, the shunt may provide a lower resistance path for the magnetic flux to extend deep into the receptacle pocket. In at least some embodiments, the entire L-shaped shunt may reside within a recessed opening of the information handling system. For example, in one embodiment, the forward-most portion of the shunt that extends toward the opening may be 0.8 mm to 1.0 mm inside the opening.

Multiple configurations of magnetic alignment connectors having different numbers and arrangements of magnets and shunts were investigated, some of which are described herein. For example, in some embodiments, the magnetic alignment connectors may include a single magnet around which an L-shaped shunt it wrapped. In other embodiments, the magnetic alignment connectors may include multiple magnets arranged such that adjacent magnets have opposite polarities. The magnets may be the same size or different sizes, in different embodiments. The magnets may all be attached to the same portion (or leg) of the L-shaped shunt or to different portions (or legs) of the L-shaped shunt. In some embodiments, the shunt may have an L-shape at each end, forming a U-shaped shunt that wraps around one or more magnets on both ends. In at least some embodiments, the shunt may be formed from magnetic steel, such as 1018 steel plate. In at least some embodiments, the shunt may be held to the magnet(s) via the magnetic force of the magnet(s). An adhesive may also be added between the magnet(s) and the shunt, in some embodiments. In other embodiments, additional hardware may be used to capture both the magnet(s) and the shunt in fixed locations such that they are in contact with each other.

Figure 6A:
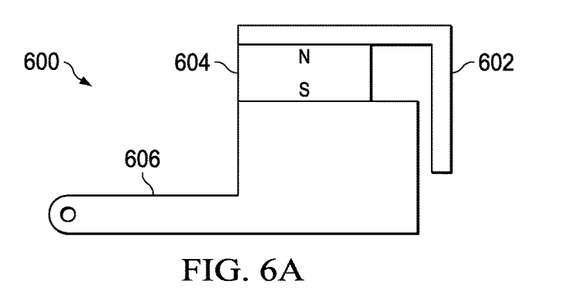
FIGS. 6A-6G illustrate respective embodiments of connection systems that include magnetic alignment connectors having L-shaped shunts.

FIGS. 6A-6G illustrate respective embodiments of connection systems that include magnetic alignment connectors having L-shaped shunts. More specifically, FIG. 6A illustrates a connection system 600 in which a magnetic alignment connector includes an L-shaped shunt 602 and a single magnet 604 that draws the head of an alignment post 606 toward the connector. In this example embodiment, there may be a designed gap between the magnet and the vertical portion of the shunt.

Figure 6B:
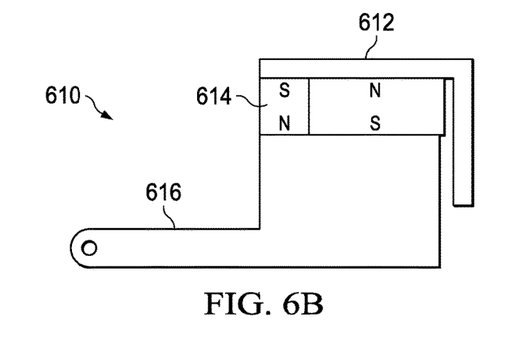

FIG. 6B illustrates a connection system 610 in which a magnetic alignment connector includes an L-shaped shunt 612 and two magnets of different sizes with alternating polarity (shown as magnets 614) that draw the head of an alignment post 616 toward the connector. More specifically, the magnetic alignment connector illustrated in FIG. 6B includes a larger magnet near the crook of its L-shaped shunt and a smaller magnet on the opposite side of the larger magnet. In some embodiments of connection system 610, there may be a designed gap between the magnet and the vertical portion of the shunt.

Note that the peak magnetic force exerted by the magnetic alignment connector shown in FIG. 6B at a gap of zero almost matches the force exerted by the magnetic alignment connector shown in FIG. 5C. However, the decay in the magnetic force as the gap is increased more closely matches the baseline design shown in FIG. 5A. The magnetic force is nearly double that of the baseline design shown in FIG. 5A over the entire range of gaps.

Figure 6C:
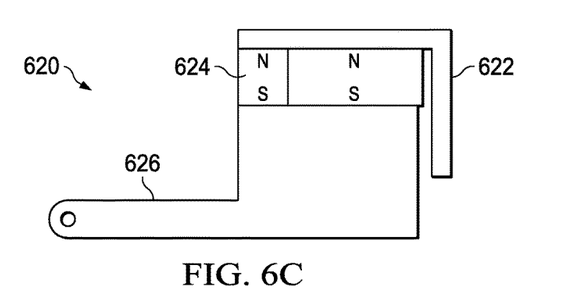

FIG. 6C illustrates a connection system 620 in which a magnetic alignment connector includes an L-shaped shunt 622 and two magnets of different sizes with alternating polarity (shown as magnets 624) that draw the head of an alignment post 626 toward the connector. In this example, unlike in connection system 610 illustrated in FIG. 6B, the polarities of the two magnets 624 are the same. As in the example illustrated in FIG. 6B, the magnetic alignment connector illustrated in FIG. 6C includes a larger magnet near the crook of its L-shaped shunt and a smaller magnet on the opposite side of the larger magnet. In some embodiments of connection system 620, there may be a designed gap between the magnet and the vertical portion of the shunt.

Figure 6D:
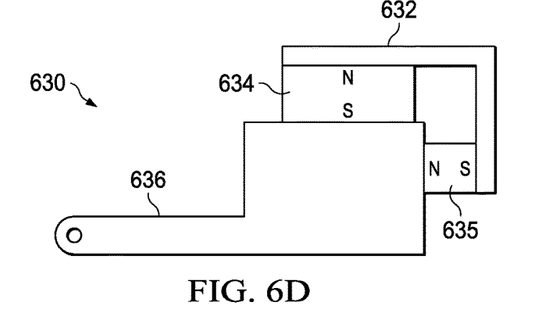
Figure 6E:
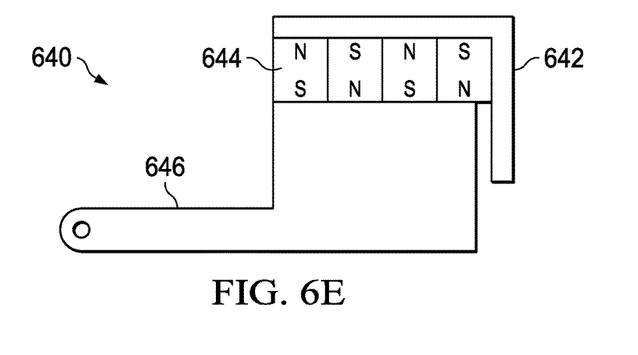

FIG. 6D illustrates a connection system 630 in which a magnetic alignment connector includes an L-shaped shunt 632 and a respective one of two magnets, shown as magnets 634 and 635, on each leg of the L-shaped shunt 632 that draw the head of an alignment post 636 toward the connector. In some embodiments of connection system 630, there may be a designed gap between magnet 635 and the vertical portion of the shunt. FIG. 6E illustrates a connection system 640 in which a magnetic alignment connector includes an L-shaped shunt 642 and four magnets of the same size with alternating polarity (shown as magnets 644) that draw the head of an alignment post 646 toward the connector. In at least some embodiments of connection system 640, there may be no designed gap between the magnets and the vertical portion of the shunt.

Figure 6F:
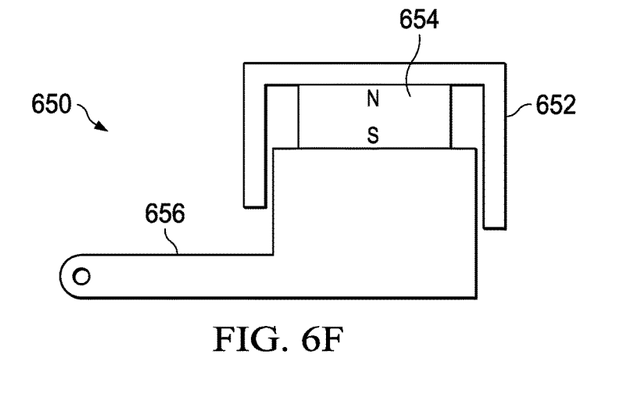

FIG. 6F illustrates a connection system 650 in which a magnetic alignment connector includes a U-shaped shunt 652 and a single magnet 654 that draws the head of an alignment post 656 toward the connector. In some embodiments of connection system 650, there may be a designed gap between the magnet and one or both of the vertical legs of the U-shaped shunt.

Figure 6G:
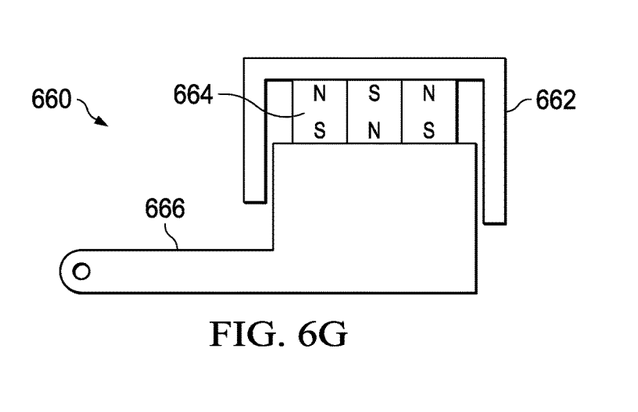

FIG. 6G illustrates a connection system 660 in which a magnetic alignment connector includes a U-shaped shunt 662 and four magnets of the same size with alternating polarity (shown as magnets 664) that draw the head of an alignment post 666 toward the connector. In some embodiments of connection system 660, there may be a designed gap between the magnets and one or both of the vertical legs of the U-shaped shunt.

While multiple example embodiments of magnetic alignment connectors that include L-shaped shunts are illustrated in the figures and described herein, it should be understood that in other embodiments, magnetic alignment connectors that include L-shaped shunts may include different numbers and arrangements of magnets around which the shunts are wrapped, and may include double-ended L-shaped shunts (e.g., U-shaped shunts) rather than single-ended L-shaped shunts. In embodiments in which there is a designed gap between the magnet(s) and the shunt, the width of the designed gap may be dependent on the dimensions of the magnet(s), the number of magnets, the size of the shunt, and/or other factors. For example, in embodiments in which these connection systems are incorporated into various information handling systems, the designed gap may be as narrow as 0.1 mm, or may potentially be several millimeters wide. In some portable information handling systems, the width of the designed gap may be in the range of 0.5 mm to 2.0 mm.

In experiments comparing different embodiments of magnetic alignment connectors, including those illustrated in FIGS. 5A-5C and 6A-6G, it was observed that the addition of an L-shaped shunt does not necessarily make the magnetic alignment connectors more forgiving of different gaps, but it does increase the magnetic force over the entire range of gaps. More traditional shunt designs, such as the design illustrated in FIG. 5C, do a good job of increasing the force at very small gaps, but the magnetic force quickly falls off to exert less force than a plain magnet. As noted above, the design illustrated in FIG. 6B exerted a very high initial force, yet had a decay curve that is close to that of the plain magnet or the L-shunt design shown in FIG. 6A.

Over the range 0 to 0.54 mm of displacement, the designs illustrated in FIGS. 6A, 6B, 6C, 6D, and 6F all provided almost double the magnetic force of the baseline design shown in FIG. 5A at the largest gap. Since a magnetic alignment connector in a production environment would need to work at the worst case gap, the additional force provided by some of the more complicated configurations, such as those illustrated in FIGS. 6C, 6D, and 6F may not be justified. In at least some embodiments in which there are size and/or cost constraints on the information handling system, such as in portable information handling systems, the systems may include magnetic alignment connectors similar to those illustrated in FIG. 6A or 6B. These designs may be easier to build and may cost less to build than those illustrated in FIGS. 6C, 6D, and 6F. In other words, any slight gains in the magnetic forces, when compared to the designs illustrated in FIG. 6A or 6B, might not be enough to justify the extra cost associated with using multiple magnets, and the cost and complexity of the assembly for the designs illustrated in FIGS. 6C, 6D, and 6F.

Figure 7A:
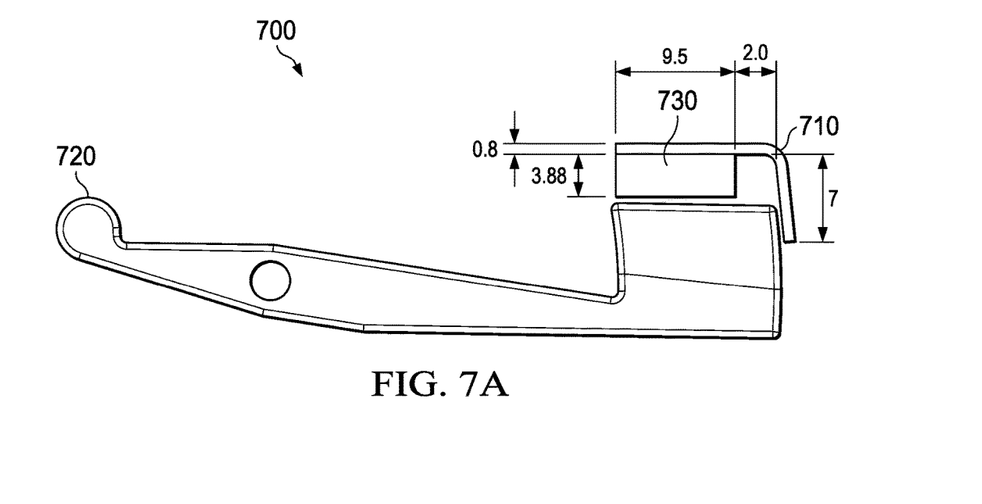
FIGS. 7A and 7B illustrate two views of an embodiment of a connection system in which a magnetic alignment connector includes an L-shaped shunt and a single magnet.
Figure 7B:
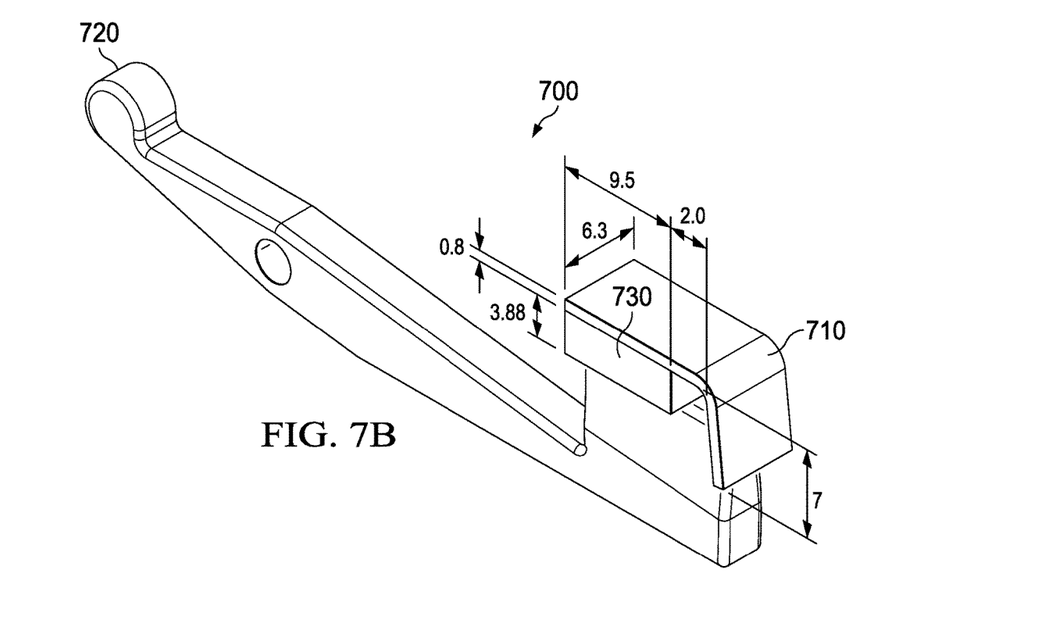

FIGS. 7A and 7B illustrate two views of an embodiment of a connection system 700 in which a magnetic alignment connector includes an L-shaped shunt 710 and a single magnet 730 that draws the head of a corresponding alignment post 720 toward the connector. In this example embodiment, the dimensions of magnet 730 are shown as a height of 3.88 mm, a length of 9.5 mm, and a width of 6.3 mm. In this example, the thickness of shunt 710 is 0.8 mm. In this example, the width of shunt 710 is equal to the width of magnet 730 (within suitable tolerances). However, the portion of shunt 710 that is in contact with magnet 730 extends past the end of magnet 730 and turns toward alignment post 720. The portion of shunt 710 that extends toward alignment post 720 is longer than magnet 730 is high, at 7 mm. Therefore, in this example, when the head of alignment post 720 is drawn up to the connector, shunt 710 overlaps the head of alignment post 720. In this example embodiment, there is a designed gap of 2.0 mm between magnet 730 and the vertical portion of shunt 710.

Figure 8:
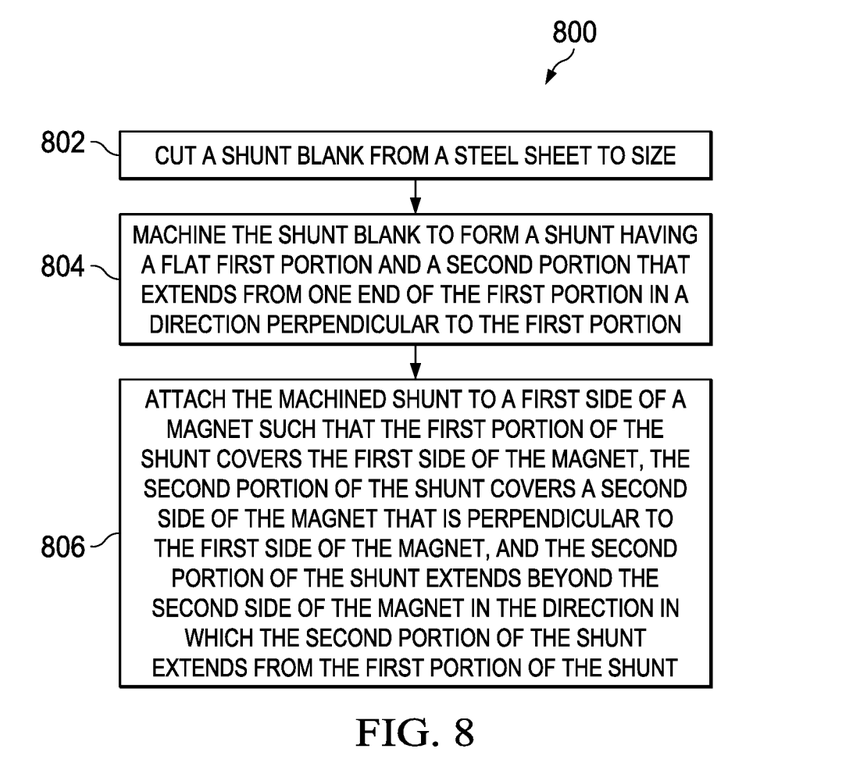
FIG. 8 is a flow diagram illustrating selected elements of an embodiment of a method for manufacturing a magnetic connector having an L-shaped shunt.

FIG. 8 is a flow diagram illustrating selected elements of an embodiment of a method 800 for manufacturing a magnetic connector having an L-shaped shunt. It is noted that certain operations described in method 800 may be optional or may be rearranged in different embodiments. Method 800 may begin, at 802, by cutting a shunt blank from a sheet of steel to an appropriate size for use with a particular magnet or collection of magnets in a connector. It is noted that materials other than steel, such as another type of magnetically permeable material with low electric conductivity may be used to create an L-shaped shunt, in different embodiments.

The shunt blank may be machined, at 804, to form a shunt having a flat first portion and a second portion that extends from one end of the first portion in a direction that is substantially perpendicular to the first portion. The flat first portion may be long enough and wide enough to cover the top side of a magnet. The second portion may be wide enough to cover a side of the magnet that is perpendicular to the top side of the magnet and may be long enough to extend beyond the length of that side, as described herein. It is noted that operations 802 and 804 may be replaced with different metal-forming techniques, in other embodiments.

The machined shunt may be attached, at 806, to a first side of a magnet (e.g., a top side of the magnet) such that the first portion of the shunt covers the first side of the magnet, the second portion of the shunt covers a second side of the magnet that is perpendicular to the first side of the magnet, and the second portion of the shunt extends beyond the second side of the magnet in the direction in which the second portion of the shunt extends from the first portion of the shunt. In some embodiments, the shunt may be attached, at 806 or in a different operation, to a first side (e.g., a top side) of one or more additional magnets, as in several of the example magnetic alignment connectors described herein. In at least some embodiments, the shunt may be held to the magnet(s) via the magnetic force of the magnet(s). An adhesive may also be added between the magnet(s) and the shunt, in some embodiments. In other embodiments, additional hardware may be used to capture both the magnet(s) and the shunt in fixed locations such that they are in contact with each other. In some embodiments, once the machined shunt is attached to one or more magnets, as described herein, it may be installed in a recessed opening or receptacle of an information handling system (not shown). The assembled connector may be mounted within the recessed opening or receptacle in any of a variety of ways. For example, in some embodiments, a type of bracket or holder may be used to fix the connector at the correct location within the recessed opening or receptacle.

While FIG. 8 illustrates one method for manufacturing a magnetic connector having an L-shaped shunt, in other embodiments, the connectors described herein may be manufactured using other metal forming techniques. For example, they may be manufactured using stamping, forging, breaking, machining, 3D printing, or other metal forming techniques, or using any combination of such techniques, in different embodiments.

Several examples of the inclusion of L-shaped shunts in magnetic connectors used for the alignment of components of an information handling system are described herein. For example, these magnetic connectors may be used to attach a keyboard, docking station, base, or other detachable component to a portable information handling system. In other embodiments, magnetic attachment using magnetic connectors that include L-shaped shunts may be the preferred coupling mechanism for other types of accessories that are attachable to other types of information handling systems (including, but not limited to, desktop computers and accessories or docks thereof) due to the usability. In addition, the techniques described herein may be used in other magnetic latching applications (e.g., those than in information handling systems) to improve performance or reduce magnet size. For example, this approach may be suitable for use in any situation in which it is desirable for a strong magnetic pull force (for alignment or other purposes) to start quickly and to remain high while the two connecting components are being pulled together.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    an alignment connector configured to receive an alignment post, comprising:
        a magnet; and
        a magnetically permeable shunt;
    wherein:
        a first portion of the shunt is substantially parallel to and in contact with the magnet on a first side of the magnet, the first side of the magnet being opposite and substantially parallel to a second side of the magnet toward which the alignment post is to be drawn;
        a second portion of the shunt extends from the first portion of the shunt, the second portion extending in a direction substantially parallel to a third side of the magnet, the third side of the magnet being substantially perpendicular to the first and second sides of the magnet, and the second portion of the shunt being longer than distance between the first and second sides of the magnet on the third side of the magnet;
        when the alignment connector receives the alignment post, a first side of the alignment post is in contact with the second side of the magnet, and the second portion of the shunt extends alongside and substantially in parallel with at least a portion of a second side of the alignment post, the second side of the alignment post being substantially perpendicular to the first side of the alignment post.

2. The information handling system of claim 1, wherein the alignment connector comprises two or more magnets in contact with the shunt.

3. The information handling system of claim 2, wherein adjacent ones of the two or more magnets have opposite polarities.

4. The information handling system of claim 2, wherein the two or more magnets are the same size.

5. The information handling system of claim 2, wherein one of the two or more magnets is larger than at least one other one of the two or more magnets.

6. The information handling system of claim 2, wherein the two or more magnets comprise two magnets in contact with the first portion of the shunt.

7. The information handling system of claim 2, wherein the two or more magnets comprise at least one magnet in contact with the first portion of the shunt and at least one magnet in contact with the second portion of the shunt.

8. The information handling system of claim 1, wherein the second portion of the shunt is separated from the third side of the magnet by a designed gap.

9. The information handling system of claim 1, wherein:
    a third portion of the shunt extends from the first portion of the shunt, the third portion extending in a direction substantially parallel to a fourth side of the magnet, the fourth side of the magnet being opposite and substantially parallel to the third side of the magnet and substantially perpendicular to the first and second sides of the magnet.

10. The information handling system of claim 1, wherein:
    the alignment connector is located within a recessed opening of a first component of the information handling system; and
    the alignment post is coupled to a second component that is detachable from the first component.

11. The information handling system of claim 10, wherein:
  the first component is a portable computing device; and
  the second component is a docking station for the portable computing device.

12. The information handling system of claim 10, wherein:
  the first component is a portable computing device; and
  the second component is a detachable accessory for the portable computing device.

13. The information handling system of claim 10, wherein the first component comprises two or more alignment connectors, each configured to receive a respective alignment post coupled to the second component.

14. The information handling system of claim 1, further comprising, a second alignment connector configured to receive a second alignment post.

15. A connector, comprising:
  a magnet; and
  a magnetically permeable shunt;
  wherein:
    a first portion of the shunt is substantially parallel to and in contact with the magnet on a first side of the magnet, the first side of the magnet being opposite and substantially parallel to a second side of the magnet toward which a post to be received by the connector is to be drawn;
    a second portion of the shunt extends from the first portion of the shunt, the second portion extending in a direction substantially parallel to a third side of the magnet, the third side of the magnet being substantially perpendicular to the first and second sides of the magnet, and the second portion of the shunt being longer than distance between the first and second sides of the magnet on the third side of the magnet;
    when the connector receives the post, a first side of the post is in contact with the second side of the magnet, and the second portion of the shunt extends alongside and substantially in parallel with at least a portion of a second side of the post, the second side of the post being substantially perpendicular to the first side of the post.

16. The connector of claim 15, further comprising:
  one or more other magnets in contact with the shunt.

17. The connector of claim 16, wherein adjacent ones of the magnets have opposite polarities.

18. The connector of claim 16, wherein one of the magnets is larger than at least one other one of the magnets.

19. The connector of claim 16, wherein two magnets are in contact with the first portion of the shunt.

20. The connector of claim 15, wherein the second portion of the shunt is separated from the third side of the magnet by a designed gap.

* * * * *